Oct. 22, 1968 W. B. McLEAN 3,407,320
WAFER TYPE SUBMERSIBLE MOTOR FOR UNDERWATER DEVICE
Filed Nov. 29, 1965 2 Sheets-Sheet 1

INVENTOR
WILLIAM B. McLEAN
BY Walter G. Finch
ATTORNEY

Oct. 22, 1968 W. B. McLEAN 3,407,320
WAFER TYPE SUBMERSIBLE MOTOR FOR UNDERWATER DEVICE
Filed Nov. 29, 1965 2 Sheets-Sheet 2

WILLIAM B. McLEAN
INVENTOR

BY Walter G. Finch
ATTORNEY

United States Patent Office 3,407,320
Patented Oct. 22, 1968

3,407,320
WAFER TYPE SUBMERSIBLE MOTOR FOR UNDERWATER DEVICE
William B. McLean, China Lake, Calif., assignor of fifty percent to Walter G. Finch, Baltimore, Md.
Filed Nov. 29, 1965, Ser. No. 510,198
8 Claims. (Cl. 310—87)

This invention relates generally to electric motors and more particularly to an alternating current motor of the emersion type.

In underwater operations requiring rotating devices, it has been difficult to provide electric motors which would operate under great hydrostatic pressure without leaking. One solution has been to construct elaborate bearings for the power output shaft whereby the water is prevented from entering by seals and baffles.

This is not satisfactory for small motors because the friction of such seals and baffles consumes a large part if not all of the motive power thereof.

Hydrostatic pressures can be balanced by filling the motor with a fluid but this, too, in the case of available motors causes losses from turbulence effects around the windings of the rotor or stator.

Thus a primary object of this invention is to provide an electric motor for underwater operation which will withstand great hydrostatic pressures without elaborate seals.

Another object of this invention is to provide an electric motor of liquid filled type which is relatively free of turbulence drag.

Still another object is to provide a motor having a small axial dimension with relation to its diameter.

Yet another object of this invention is to provide a motor of low impedance which is well-suited for operation from low voltages as from transistor power supplies thus simplifying the insulation problem in water immersion.

This invention contemplates the provision of a novel AC motor which is self-starting or synchronous, has no brushes, will operate at high frequencies and can be assembled from pluralities of the same parts to make up a motor of any power.

Other objects and attendant advantages will become more readily apparent and understood from the following detailed specification and accompanying drawings in which.

Figure 1:
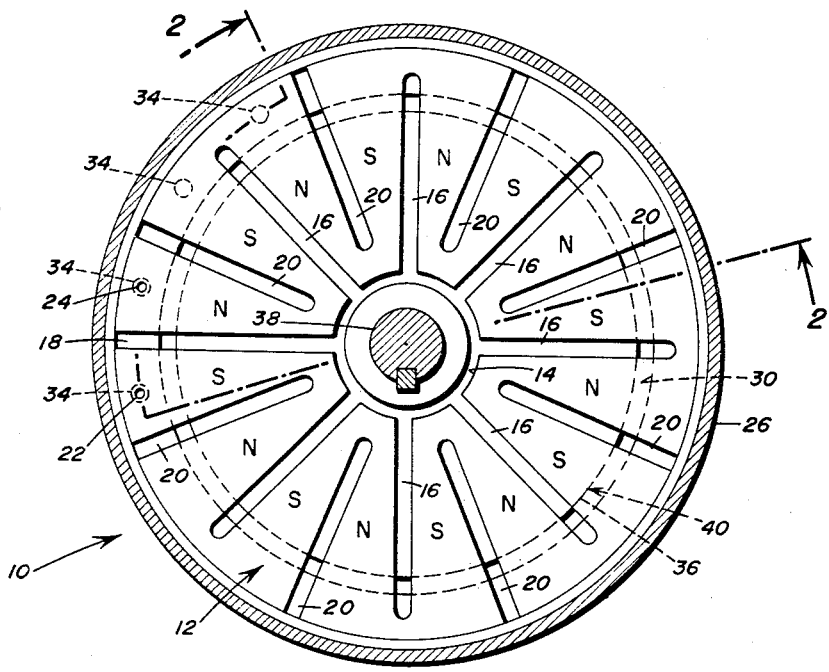
FIG. 1 is a vertical section of a motor incorporating features of this invention.

Referring now to the details of the drawings, particularly FIG. 1, the motor 10 comprises one or more circular drive coil discs 12 as shown. These discs 12 are punched from copper sheet or formed by printed circuit techniques and from a hole 14 in the center a plurality of slots 16 extend radially outward at equally spaced intervals nearly to the periphery of the disc except one slot, reference 18, which is cut all the way out.

Other slots 20 are provided midway between the slots 16 and extend radially inward from the periphery nearly to the hole 14.

Near the periphery on each disc 12 a pair of small terminal holes 22 and 24 are formed, one on each side of the long slot 18. If an electric current is passed from one terminal hole 22 to the other 24 it will be noted a long sinusoidal path of loops exists to the flow of current around the disc due to the interdigitized slots 16 and 20 and, in accordance with the laws of electro-magnetism, alternate local polarity magnetic fields N and S will exist within adjacent loops.

Figure 2:
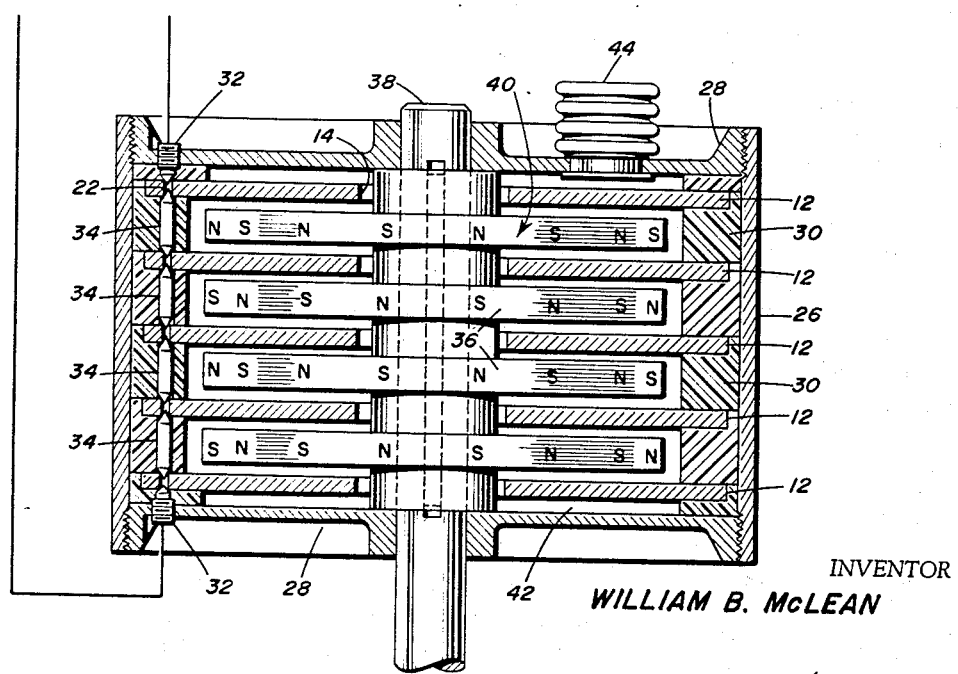
FIG. 2 is a horizontal cut-away view, partly in section, of the motor of FIG. 1.

The motor 10 is assembled within a fluid-tight cylinder body 26 to which are secured a pair of spaced end plates 28 as best shown in FIG. 2. As many drive coil discs 12 as desired are stacked within this body 26 and spaced from each other by insulating spacer rings 30. The outermost discs 12 are arranged to be contacted by a contact screw 32 from the exterior to provide an electrical lead-in. The screw 32 is pointed so as to engage in one of the terminal holes 22.

The other terminal hole 24 is electrically connected with the terminal hole 22 of the proximate disc 12 by means of a double pointed jumper 34 which extends through each spacer ring 30. It will be noted this connects the plurality of drive coil discs 12 in series.

The motor rotor 40 is comprised of a plurality of flat discs 36 made of high retentivity permanent magnet material and mounted in inter-spaced relationship to the discs 12 on a shaft 38. The plurality of drive coil discs 12 are arranged so that the fields from discs to disc oppose each other. Shaft 38 extends through the center hole 14 of the discs 12 and is journaled in the end plates 28. The rotor discs 36 are permanently magnetized with polarity N and S at spaced intervals corresponding to the electromagnetic fields previously related of the discs 12.

Consequently, the rotor 40 will move to align its magnetic fields opposite polarity to those of the drive coil discs 12 and will continue to turn if the fields of the latter change periodically as from excitation from an AC source of power to terminals 22, and 24.

The motor 10 is completely filled with a relatively incompressible liquid 42 and thus will withstand any outside pressure without collapsing or leaking. To avoid any "breathing" leaks through the shaft journals due to the thermal expansion or contraction of the contained liquid, a closed end liquid-filled bellows 44 is mounted on the end plate 28 and communicates with the liquid-filled interior of the body 26.

Figure 3:
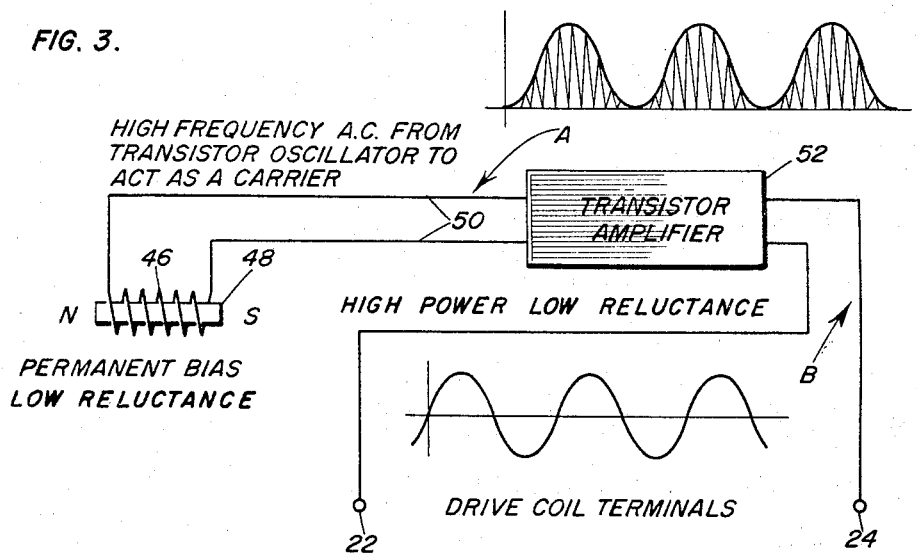
FIG. 3 is a schematic diagram of a circuit for powering the motor from direct current and showing the wave forms involved.

The motor 10 can be operated from AC current as noted or can be adapted to run from a DC-to-AC converter. It is to be noted particularly that the motor 10 can run synchronous when provided with an external AC signal. When the motor 10 is adapted to run from a DC-to-AC converter, it is convenient to supply a reference frequency derived from the motor itself. As shown in FIG. 3, reference numeral 46 designates a pickup coil which is suitably mounted on or in the body 26 in proximity to one of the rotor discs 36. This coil 46 is wound on a core 48 which is permanently biased magnetically and has low reluctance. The movement of the rotor disc 36 with its localized magnetic fields will influence the field of coil 46 and cause a changing current to flow in leads 50.

This current is undulatory as shown by the wave form A and can be converted to an AC wave form B having any amount of drive power by a DC powered transistor amplifier 52 for application to the drive coil terminals 22, 24.

The speed of the motor 10 may be changed by changing the position of the pickup coil 46 on the body 26 or by changing the frequency of the AC supply. Electrical phase shifting in the amplifier 52 may also be employed for this purpose.

The total general operation of the system is such that the current elements and flux elements reverse both from disc 12 to disc and from segment to segment, maintaining such a relationship that the torque on the margnets is always in the same direction and is additive for each current magnetic pole interaction. With respect to FIG. 3, the system illustrated which is only one of many for determining the position of the permanent magnets relative to the field drive coils, is one in which variable reluctance reactor is permanently biased in one direction. Its impedance peak to high frequency oscillations will decrease or increase depending on whether the field from the permanent magnets on the rotor tend to aid or neutralize the permanent biased field. This will modulate the envelope of the high-frequency carrier signal which can then be rectified and demodulated to drive the transistor amplifier which will provide current flow in the driving discs 12. The motor 10 is self-starting upon application of power to the drive unit because the pick-up coil will generate a signal depending on the position of the magnets relative to the coil element. The signal will always be in the right direction to cause the magnetized discs to turn in a predetermined direction. The motion of the pick-up coil through one magnetic segment will reverse the signal and cause the discs 12 to start and run in the opposite direction.

As an alternate for the variable reluctance pick-up, a drive power to the driving discs 12 can be supplied by a reversing switch. A double-pole double-throw reversing switch, whose position is controlled by the interaction of a small permanent magnet on the switch with the magnetic fields of the rotor, can be used. It is important that the transistor amplifier be arranged so that it gives an output signal relative to the position of the magnets rather than to their rate of change of position in order to insure that the unit is self-starting.

The invention will find wide use anywhere motors are used where brush wires are an important problem. This motor 10 will have its widest application where high reliability, low cost and production or operation in fluids is involved.

Obviously many modifications and variations of the present invention are possible in light of the above teachings. It is, therefore, to be understood that within the scope of the appended claims the invention may be practiced otherwise than as specifically described.

What is claimed is:

1. An AC motor, comprising a plurality of elements in spaced stacked relation, each said elements including a central aperture and structure defining a sinusoidal electrical path circularly about said aperture for producing alternate polarity electromagnetic fields in opposition to the electromagnetic fields in adjacent said elements, means electrically connecting said discs in series, and rotor means including a rotatably mounted shaft extending through said aperture of each said elements, said rotor means including permanently magnetized elements mounted on said shaft at intervals responsive to the rotative influence of said electromagnetic fields of said elements.

2. The AC motor of claim 1, and additionally, a fluid-tight housing for said plurality of elements, electrically connecting means, and rotor means, a liquid filling said fluid-tight housing, and bellows means positioned on said housing and communicating with its interior for equalizing the pressure exteriorally of said housing with said interior thereof.

3. The AC motor of claim 1 wherein each said elements consists of a disc having slots extending from said aperture nearly to the periphery of said disc, additional slots interspaced with said first mentioned slots and extending from said periphery nearly to said aperture, and a slot extending from said aperture to said periphery.

4. The AC motor of claim 3 wherein each said elements has a pair of spaced terminals, one on each side of said last mentioned slot and said elements are connected in series via said terminals.

5. The AC motor of claim 1 wherein said permanently magnetized elements are mounted on said shaft at intervals corresponding to the electromagnetic fields of said elements.

6. The AC motor of claim 1 wherein insulating means are positioned in the spaces between said elements.

7. The AC motor of claim 1 wherein said electrically connecting means connect the sinusoidal electrical path of each said element in series.

8. The AC motor of claim 1 and additionally pickup coil means for supplying a reference frequency for said motor.

References Cited

UNITED STATES PATENTS

| 2,715,687 | 8/1955 | Makous | 310—87 |
| 2,938,131 | 5/1960 | Maynard | 310—87 |
| 3,090,880 | 5/1963 | Raymond | 310—268 |
| 3,169,204 | 2/1965 | Moressee et al. | 310—268 |

MILTON O. HIRSHFIELD, *Primary Examiner.*

WARREN E. RAY, *Assistant Examiner.*